(12) United States Patent
Pollard et al.

(10) Patent No.: US 10,005,563 B2
(45) Date of Patent: Jun. 26, 2018

(54) METHODS AND APPARATUS FOR DETERMINING SEATBELT STATUS

(71) Applicant: The Boeing Company, Chicago, IL (US)

(72) Inventors: Gerald Pollard, Snohomish, WA (US); Joseph M. Fletcher, Seattle, WA (US)

(73) Assignee: The Boeing Company, Chicago, IL (US)

( * ) Notice: Subject to any disclaimer, the term of this patent is extended or adjusted under 35 U.S.C. 154(b) by 25 days.

(21) Appl. No.: 14/949,360

(22) Filed: Nov. 23, 2015

(65) Prior Publication Data
US 2017/0144774 A1    May 25, 2017

(51) Int. Cl.
*G08B 21/00* (2006.01)
*B64D 45/00* (2006.01)
*B60R 22/48* (2006.01)
*B64D 11/06* (2006.01)
*B60R 21/01* (2006.01)
(Continued)

(52) U.S. Cl.
CPC .............. *B64D 45/00* (2013.01); *B60R 22/48* (2013.01); *B64D 11/062* (2014.12); *A44B 11/2569* (2013.01); *B60R 2021/0093* (2013.01); *B60R 2021/01088* (2013.01); *B60R 2022/4816* (2013.01); *B60R 2022/4858* (2013.01); *B60R 2022/4866* (2013.01)

(58) Field of Classification Search
CPC ........ B64D 45/00; B64D 11/062; B60R 22/48
USPC .............................................. 340/457.1, 945
See application file for complete search history.

(56) References Cited

U.S. PATENT DOCUMENTS 6,477,753 B1    11/2002  Burke
8,427,294 B2 *   4/2013  Cheung .............. A44B 11/2569
                                                    340/457.1
(Continued)

FOREIGN PATENT DOCUMENTS

DE         19606790      8/1997
DE       102004025319    12/2005
(Continued)

OTHER PUBLICATIONS

Window definition, MacMillan Dictionary, Jul. 10, 2017, http://www.macmillandictionary.com/us/dictionary/american/window.*
(Continued)

*Primary Examiner* — Kerri McNally
(74) *Attorney, Agent, or Firm* — Hanley, Flight & Zimmerman, LLC

(57) ABSTRACT

Methods and apparatus for determining seatbelt status are disclosed. An example seatbelt system for a mass transit vehicle includes a first seatbelt of a first seat that includes a first buckle and a first magnetically-responsive switch to detect a first tongue when the first seatbelt is in a fastened position. The example apparatus includes a second seatbelt of a second seat that includes a second buckle and a second magnetically-responsive switch to detect a second tongue when the second seatbelt is in the fastened position. The example apparatus includes a remote monitoring unit to indicate, when the first seat is occupied, if the first seatbelt is in the fastened positioned or an unfastened position. The remote monitoring unit is to indicate, when the second seat is occupied, if the second seatbelt is in the fastened positioned or the unfastened position.

17 Claims, 8 Drawing Sheets

(51) Int. Cl.
    *A44B 11/25*    (2006.01)
    *B60R 21/00*    (2006.01)

(56) References Cited

U.S. PATENT DOCUMENTS

| | | | |
|---|---|---|---|
| 2003/0014166 A1* | 1/2003 | Chinigo | B60R 21/01512 |
| | | | 701/33.7 |
| 2007/0236917 A1 | 10/2007 | Gray et al. | |
| 2008/0048858 A1* | 2/2008 | Lueth | B60Q 1/50 |
| | | | 340/540 |
| 2008/0068220 A1 | 3/2008 | Giesa et al. | |
| 2009/0050393 A1* | 2/2009 | Oyerokun | B60R 22/48 |
| | | | 180/270 |
| 2009/0132128 A1* | 5/2009 | Marriott | B60R 22/48 |
| | | | 701/45 |
| 2009/0177357 A1 | 7/2009 | Long et al. | |
| 2015/0089777 A1 | 4/2015 | Hung | |

FOREIGN PATENT DOCUMENTS

| | | |
|---|---|---|
| DE | 102007019656 | 10/2008 |
| EP | 1424250 | 6/2004 |
| JP | H0585491 | 4/1993 |
| JP | 2011068183 | 4/2011 |
| WO | 2011052415 | 5/2011 |

OTHER PUBLICATIONS

European Patent Office, "Partial European Search Report," issued in connection with European Patent Application No. 16194342.8, dated Feb. 21, 2017, 11 pages.

European Patent Office, "Extended European Search Report," issued in connection with European Patent Application No. 16194342.8, dated Jun. 6, 2017, 16 pages.

* cited by examiner

METHODS AND APPARATUS FOR DETERMINING SEATBELT STATUS

FIELD OF THE DISCLOSURE

This patent relates generally to seatbelts and, more particularly, to methods and apparatus for determining seatbelt status.

BACKGROUND

Mass transit vehicles (e.g., aircraft, buses, trains, ferries, etc.) often include seatbelts. The seatbelts of mass transit vehicles are used to secure passengers in seats to reduce a likelihood of the passengers being ejected from their seats if the mass transit vehicle is involved in a collision, turbulence and/or a sudden stop. In some instances, the passengers may fail to fasten the seatbelts to secure themselves in the seats, thereby increasing a likelihood of the passengers being ejected from their seats. To increase use of the seatbelts (i.e., compliance) by the passengers, attendants (e.g., passenger attendants, flight attendants, train attendants, etc.) visually inspect whether the passengers have fastened in the seatbelts.

SUMMARY

In one example, a seatbelt system for a mass transit vehicle includes a first seatbelt of a first seat that includes a first buckle defining a first cavity to receive a first tongue in a fastened position and a first magnetically-responsive switch disposed in the first cavity to detect the first tongue when the first seatbelt is in the fastened position. The example system includes a second seatbelt of a second seat that includes a second buckle defining a second cavity to receive a second tongue in the fastened position and a second magnetically-responsive switch disposed in the second cavity to detect the second tongue when the second seatbelt is in the fastened position. The example system includes a remote monitoring unit to indicate, when the first seat is occupied, if the first seatbelt is in the fastened positioned or an unfastened position. The remote monitoring unit is to indicate, when the second seat is occupied, if the second seatbelt is in the fastened positioned or the unfastened position.

In another example, a method for monitoring seatbelts in a mass transit vehicle includes detecting, via a first magnetically-responsive switch, if a first seatbelt of a first seat is in a fastened position or an unfastened position. The first magnetically-responsive switch is disposed in a first buckle of the first seatbelt to detect a first tongue when the first seatbelt is in the fastened position. The example method includes detecting, via a second magnetically-responsive switch, if a second seatbelt of a second seat is in the fastened position or the unfastened position. The second magnetically-responsive switch is disposed in a second buckle of the second seatbelt to detect a second tongue when the second seatbelt is in the fastened position. The example method includes communicating a status of the first seatbelt and a status of the second seatbelt to a remote monitoring unit. The example method includes displaying, via the remote monitoring unit, the status of the first seatbelt when the first seat is occupied and the status of the second seatbelt when the second seat is occupied.

In another example, a mass transit vehicle system includes first means for detecting when a first seatbelt of a first seat is in a fastened position. The first means for detecting is disposed in a first buckle of the first seatbelt to detect a first tongue when the first seatbelt is in the fastened position. The example system includes second means for detecting when a second seatbelt of a first seat is in the fastened position. The second means for detecting is disposed in a second buckle of the second seatbelt to detect a second tongue when the second seatbelt is in the fastened position. The example system includes means for communicating a status of the first seatbelt and a status of the second seatbelt. The example system includes means for displaying to indicate the status of the first seatbelt when the first seat is occupied and to display the status of the second seatbelt when the second seat is occupied.

BRIEF DESCRIPTION OF THE DRAWINGS

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Figure 1:
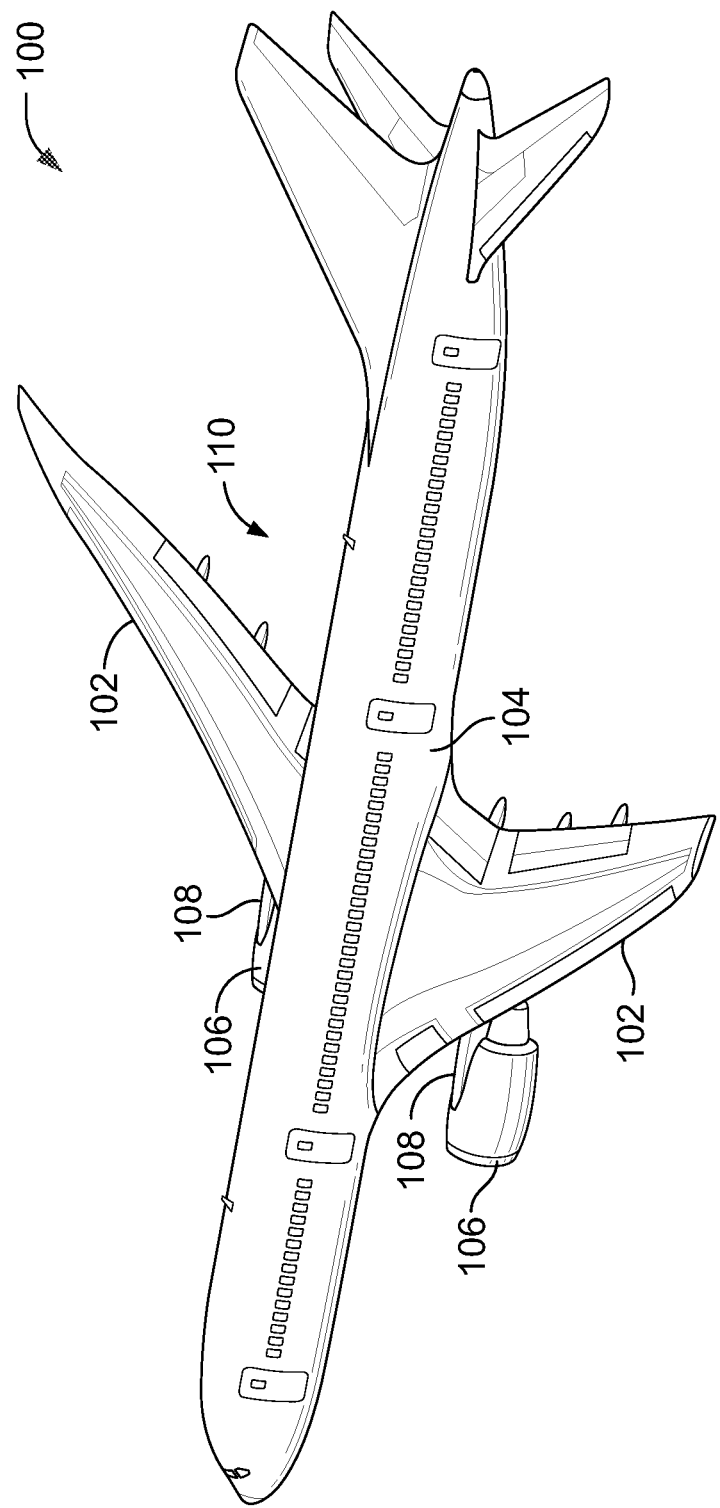
FIG. 1 depicts an example aircraft in accordance with the teachings disclosed herein.

Many known mass transit vehicles (e.g., aircraft, buses, trains, ferries, etc.) include seatbelts to secure passengers in seats of the mass transit vehicles. For example, seatbelts secure passengers in seats of mass transit vehicles to prevent the passengers from being ejected from the seats upon a collision, turbulence and/or a sudden stop.

Some known seatbelts include a tongue and a buckle in which the buckle receives and holds the tongue to fasten the seatbelt. The buckle of some known seatbelts is coupled to one or more straps, and the tongue of such known seatbelts is coupled to one or more straps. To secure the passenger in a seat, the straps of the tongue and/or the buckle extend over a portion (e.g., a waist, a torso, a chest, etc.) of the passenger, and the tongue of the seatbelt is fastenably received by the buckle of the seatbelt.

In some instances, passengers of known mass transit vehicles may not fasten the seatbelt to secure themselves in the corresponding seats, thereby increasing the likelihood that such passengers are ejected from their seats if the mass transit vehicle is involved in a collision, turbulence and/or an abrupt change in velocity. For example, some passengers may forget to fasten their seatbelts upon sitting in their seats or choose not to fasten their seatbelts. Crew members (e.g., flight attendants, train attendants, rail attendants, etc.) may traverse through passenger compartments of the mass transit vehicles to visually inspect whether the passengers have securely fastened their seatbelts. The passengers may unfasten their seatbelts following the attendant's inspection.

The example methods, systems, and apparatus disclosed herein facilitate identification of unfastened seatbelts of occupied seats of a mass transit vehicle by crew members and/or passengers of the mass transit vehicle to increase use of the seatbelts and, thus, to reduce the likelihood of the passengers of the mass transit vehicle of from being ejected from their seats. Additionally, notice may be provided to alert crew to an unbuckled passenger seatbelt and the need traverse through passenger compartments to visually inspect passenger seatbelts may be reduced. An example seatbelt system disclosed herein includes a first seatbelt of a first seat and a second seatbelt of a second seat of a mass transit vehicle. The first seatbelt includes a first buckle that defines a first cavity to receive a first tongue in a fastened position and a first magnetically-responsive switch disposed in the first cavity to detect the first tongue when the first seatbelt is in the fastened position. The second seatbelt includes a second buckle that defines a second cavity to receive a second tongue in the fastened position and a second magnetically-responsive switch disposed in the second cavity to detect the second tongue when the second seatbelt is in the fastened position. Further, the example seatbelt system includes a remote monitoring unit. When the first seat is occupied by a passenger, the remote monitoring unit indicates if the seatbelt is in the fastened position or an unfastened position. Similarly, when the second seat is occupied by a passenger, the remote monitoring unit indicates if the seatbelt is in the fastened position or in the unfastened position.

The first and second tongues of the respective first and second seatbelts may be composed of metallic material so that the first and second magnetically-responsive switches can detect the first and second tongues in the respective fastened positions. The first and second magnetically-responsive switches may be micro-reed relays, reed switches, or Hall-effect sensors that detect the first and second tongues of the respective first and second seatbelts. The example seatbelts having the magnetically-responsive switches may be incorporated in mass transit vehicles, such as aircraft, buses, trains, ferries, etc., to enables the passengers, pilots and/or attendants of the mass transit vehicles to identify occupied seats for which the corresponding seatbelts are unfastened. Additionally or alternatively, the magnetically-responsive switches of the example seatbelts can be incorporated in other vehicles such as personal vehicles (e.g., cars, trucks, boats, etc.), tractor units (e.g., tractor-trailers, agricultural tractors, etc.) racing vehicles, roller coasters, etc.

Seatbelts disclosed herein include a release button that is to be maintained in a release position by a passenger to enable the tongue to be removed from the buckle to transition the seatbelt from a fastened position to an unfastened position. Additionally or alternatively, some example seatbelts disclosed herein include release latches (e.g., a first release latch, a second release latch) that are to be moved to respective release positions by the passenger to enable the tongue to be removed from buckle to transition the seatbelt from the fastened position to the unfastened position. For example, a release latch moves from a rest position to a release position to enable the tongue of the seatbelt to transition from the fastened position to the unfastened position. Such disclosed seatbelts require the release button and the release latches to be in the respective release positions to enable the tongue of the seatbelt to be removed from the buckle of the seatbelt. Thus, the release latches enhance the safety provided by such seatbelts by maintaining the seatbelts in the fastened position if the release button is accidently engaged and enabling the tongue to be released from the buckle only when both the release button and the side release latches are engaged purposefully by the passenger.

The seatbelts may optionally include magnetically-responsive switches (e.g., a third magnetically-responsive switch, a fourth magnetically-responsive switch, etc.) to detect when the release latches are in the respective rest positions. In such examples, the magnetically-responsive switches identify that the seatbelt is in the unfastened position if the magnetically-responsive switches detect that one of the release latches is in the release position and/or that the tongue of the seatbelt is not received by the buckle. As a result, the magnetically-responsive switches increase the safety provided by the example seatbelts by identifying which of the seatbelts are in the unfastened position and, thus, identifying which of the passengers are not compliant and secured in their seats.

Seatbelts disclosed herein include a wireless transceiver (e.g., a Bluetooth module) to wirelessly transmit a status of the corresponding seatbelt to the remote monitoring unit of the mass transit vehicle. For example, a first wireless transceiver coupled to and/or disposed in the first buckle of the first seatbelt is to wirelessly transmit a status of the of the first seatbelt to a wireless receiver of the remote monitoring unit, and a second wireless transceiver coupled to and/or disposed in the second buckle of the second seatbelt is to wirelessly transmit a status of the of the second seatbelt to the wireless receiver of the remote monitoring unit. By utilizing wireless communication between the seatbelts and the remote monitoring unit, the examples disclosed herein reduce an amount of electrical wiring throughout the mass transit vehicle, thereby reducing an amount of weight, cost, and complexity added to the mass transit vehicle. In some examples, the remote monitoring unit and/or a communication module (e.g., a wireless communication module, a Bluetooth module, etc.) of a seatbelt (e.g., the first seatbelt, the second seatbelt) logs a status history (e.g., a first status history, a second status history) of the seatbelt. For example, the status history logged by the remote monitoring unit and/or the communication module provides information about whether a passenger was secured in his or her seat during a particular event (e.g., a collision) that occurred on the mass transit vehicle.

The example remote monitoring units disclosed herein enable crew members (e.g., pilots, flight attendants, train attendants, rail attendants, etc.) of a mass transit vehicle (e.g., an aircraft, a bus, a train, a ferry, etc.) to identify from a single location (e.g., a flight deck, crew area, closet, etc.), which may or may not have direct line of sight, the passengers of the mass transit vehicle that are not secured in their seats by their seatbelts. Example remote monitoring units display which of the seats of the mass transit vehicle are unoccupied, are occupied and include a seatbelt in a fastened position, and are occupied and include a seatbelt in an unfastened position. In some examples, the remote monitoring unit emits an audio alarm to notify an attendant that a seatbelt for at least one occupied seat of the mass transit vehicle is in an unfastened position. As a result, the example remote monitoring units enable crew members to continuously monitor status of the seatbelts of the mass transit vehicle from a single, convenient location, and optionally may be done without visual inspection by an attendant.

The systems disclosed herein may optionally include display units (e.g., a first display unit, a second display unit) adjacent corresponding seats (e.g., the first seat, the second seat) of the mass transit vehicle that indicate status of the seats and/or the corresponding seatbelts (e.g., the first seatbelt, the second seatbelt). The systems disclosed herein may also optionally include audio units (e.g., a first audio unit, a second audio unit) adjacent corresponding seats to emit an audio alarm (e.g., a first audio alarm, a second audio alarm) if the corresponding seat is occupied and the corresponding seatbelts are unfastened. The example display units and audio units adjacent the seats provide passengers of the seats with a warning that their seatbelts are unfastened to increase use of the seatbelts (i.e., compliance) by the passengers.

Turning to the figures, FIG. 1 illustrates an example aircraft 100 including wings 102 (e.g., a right wing and a left wing) extending laterally outward from a fuselage 104. Each of the wings 102 of the illustrated example supports an aircraft engine 106 via a pylon 108. A passenger compartment 110 is disposed within the fuselage 104 of the illustrated example.

Figure 2B:
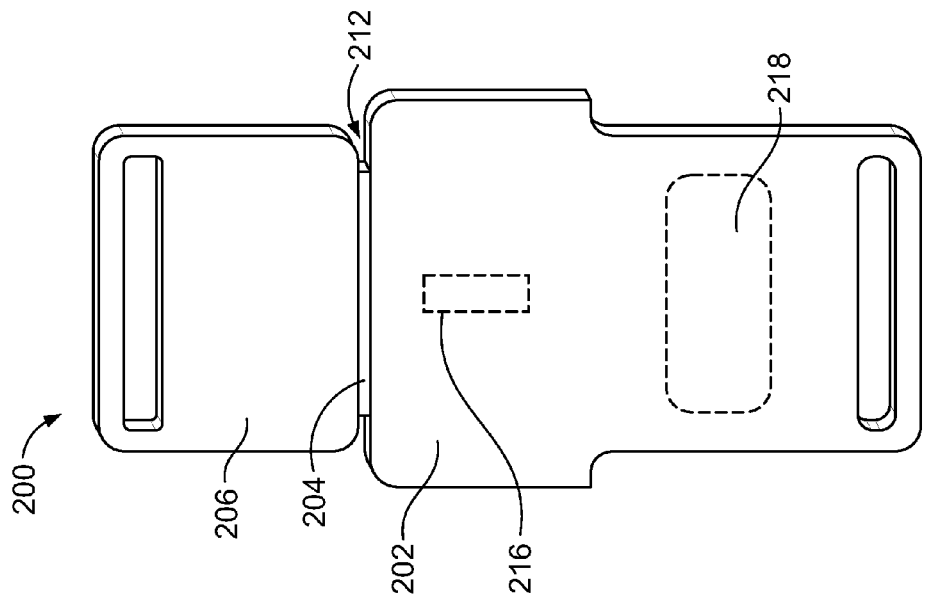
FIG. 2B is a rear view of the example seatbelt of FIG. 2A.
Figure 2A:
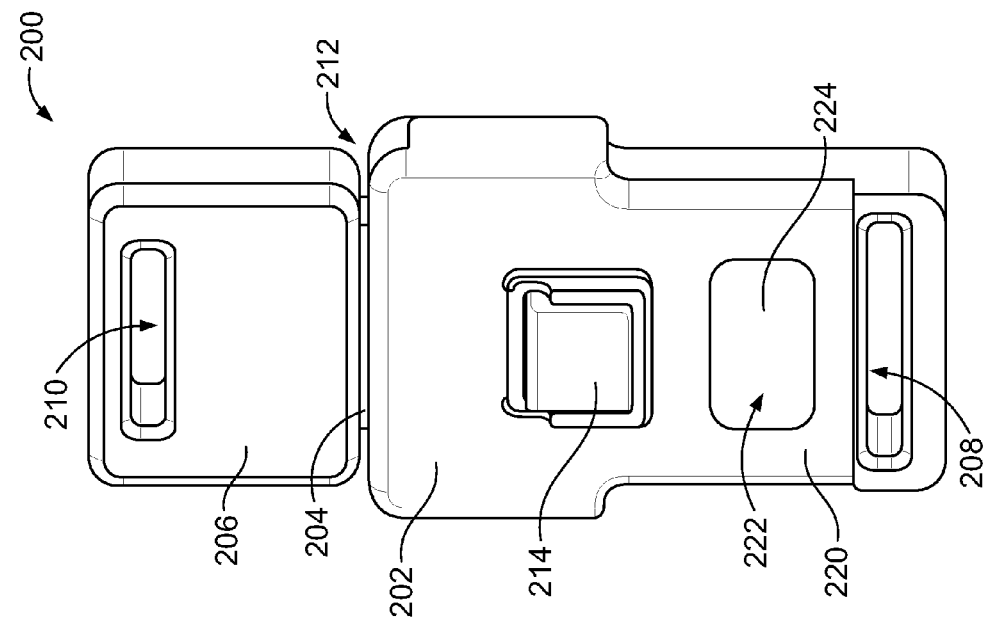
FIG. 2A is a perspective view of an example seatbelt constructed in accordance with the teachings disclosed herein.

FIGS. 2A-2B illustrate an example seatbelt 200 of a mass transit vehicle (e.g., the aircraft 100 of FIG. 1) in accordance with the teachings herein. More specifically, FIG. 2A is a perspective view of the example seatbelt 200, and FIG. 2B is a rear view of the example seatbelt 200. The example seatbelt 200 includes a buckle 202 and a tongue 204 coupled to a handle 206. The buckle 202 defines an aperture 208 (e.g., a first aperture) through which a belt (e.g., a first belt, a first strap, first webbing, etc.) extends to couple to the buckle 202, and the handle 206 defines an aperture 210 (e.g., a second aperture) through which another belt (e.g., a second belt, a second strap, second webbing, etc.) extends to couple to the handle 206. In the illustrated example, the buckle 202, the tongue 204, and the handle 206 of the seatbelt 200 are composed of steel and/or another high strength material that enables the seatbelt 200 to withstand large forces.

In the illustrated example of FIGS. 2A-2B, the seatbelt 200 is in a fastened position in which the tongue 204 is securely received by the buckle 202 to secure a passenger in a seat. For example, in the fastened position, the tongue 204 is inserted into and securely fastened within an opening or cavity 212 of the buckle 202. To transition the example seatbelt 200 from the fastened position to an unfastened position in which the tongue 204 is not securely received by the buckle 202, the passenger engages a release button 214 and removes the tongue 204 from the cavity 212 of the buckle 202. For example, to unfasten the seatbelt 200, the passenger presses the release button 214 to a release position, maintains the release button 214 in the release position, and removes the tongue 204 from the cavity 212 of the buckle 202 by pulling the handle 206 in a direction away from the cavity 212.

As illustrated in FIG. 2B, the example seatbelt 200 includes a sensor 216 and a wireless communication module 218 disposed in the cavity 212 of the buckle 202. The sensor 216 of the illustrated example identifies a status of the seatbelt 200 by detecting when the tongue 204 is in a secured position (e.g., by detecting when the tongue 204 is securely received by the buckle 202). For example, the sensor 216 identifies that the seatbelt 200 is in the fastened position by detecting that the tongue 204 is in the secured position and identifies that the seatbelt 200 is in the unfastened position by detecting that the tongue 204 is not in the secured position.

In the illustrated example, the sensor 216 is in communication (e.g., electronic communication, wired communication, etc.) with the wireless communication module 218. The wireless communication module 218 of the illustrated example wirelessly communicates the status of the seatbelt 200 (e.g., the fastened position, the unfastened position) to a remote location. For example, the wireless communication module 218 wirelessly communicates the status of the seatbelt 200 to a remote monitoring unit (e.g., a remote monitoring unit 406 of FIG. 4) of the mass transit vehicle.

In the illustrated example, the wireless communication module 218 is a Bluetooth module. As illustrated in FIG. 2A, a surface 220 of the buckle 202 of the example seatbelt 200 defines a window 222 adjacent the wireless communication module 218 that enables the wireless communication module 218 to communicate the status of the seatbelt 200 to the remote location. For example, the window 222 of the buckle 202 enables a signal (e.g., a wireless signal) of the wireless communication module 218 to be sent from within the cavity 212 enclosed by the material of the buckle 202 that would otherwise interfere with a signal transmitted by a Bluetooth module. The window 222 of FIG. 2A is covered by a cover 224 composed of, for example, plastic and/or any other material that does not interfere with a signal of a Bluetooth module to enable the signal to be communicated from the cavity 212 of the buckle 202. Further, the cover 224 prevents other objects from the entering the cavity 212 of the buckle 202 and damaging components disposed in the cavity 212 (e.g., the sensor 216, the wireless communication module 218). In some examples in which the wireless communication module 218 is a Bluetooth module, the wireless communication module 218 is powered by a battery that is disposed in the cavity 212 of the buckle 202. In some examples, the lifespan of the battery may be extended by causing the wireless communication module 218 to enter a sleep mode when the wireless communication module 218 is not communicating data.

Figure 3:
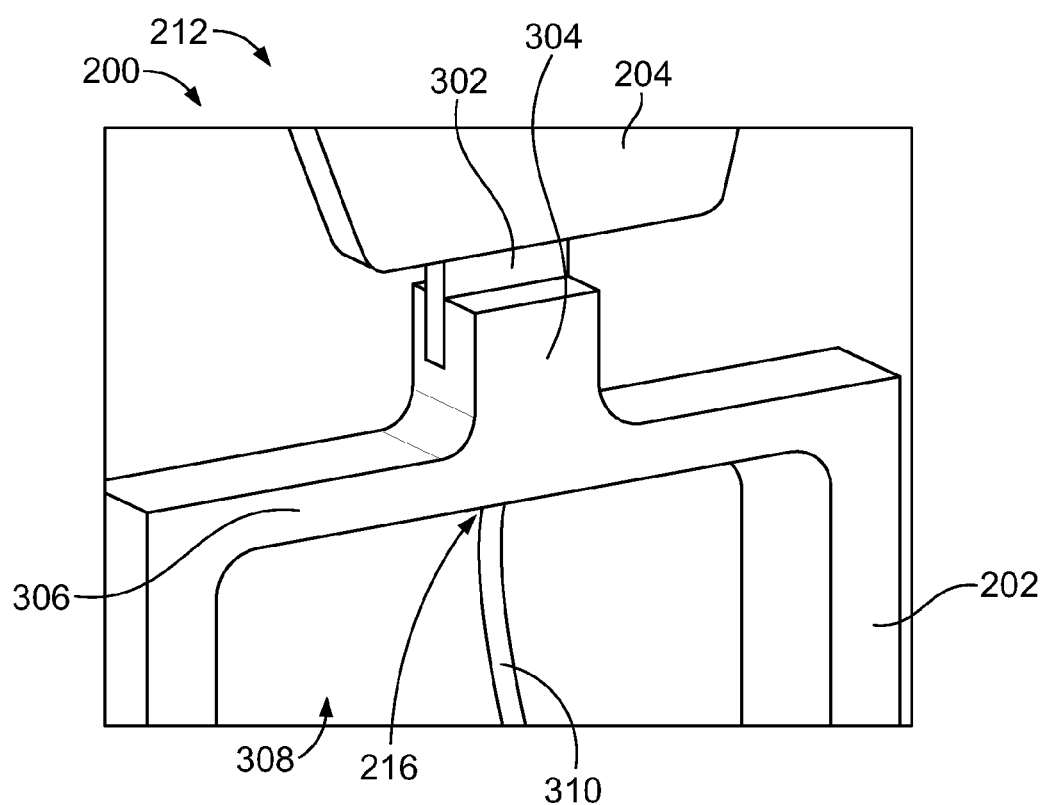
FIG. 3 depicts a cavity of a buckle of the example seatbelt of FIGS. 2A-2B in a fastened position.

FIG. 3 depicts the cavity 212 of the buckle 202 of the example seatbelt 200 in the fastened position. As illustrated in FIG. 3, the tongue 204 is securely fastened to the buckle 202 when the seatbelt 200 is in the fastened position. For example, a male end 302 of the tongue 204 is securely received by a female end 304 of the buckle 202. As illustrated in FIG. 3, the female end 304 is coupled to a wall 306 that defines a recess 308 in the cavity 212 of the buckle 202. For example, the female end 304 is integrally formed with the wall 306. The recess 308 defined by the wall 306 contains the wireless communication module 218 (FIGS. 2A-2B), a battery to power the wireless communication module 218 (FIGS. 2A-2B) and/or other electrical components disposed in the cavity 212 of the buckle 202. The recess 308 of the illustrated contains wiring 310 that is coupled to the sensor 216 (FIG. 2) and the wireless communication module 218 to communicatively couple the sensor 216 and the wireless communication module 218.

In the illustrated example, the sensor 216 detects whether the male end 302 of the tongue 204 is received by the female end 304 of the buckle 202 to determine the status of the seatbelt 200. For example, when the sensor 216 detects that the male end 302 is received by the female end 304, the sensor 216 sends, via the wiring 310, a signal to the wireless communication module 218 indicating that the male end 302 is in the secured position. In turn, the wireless communication module 218 determines that the seatbelt 200 is in the fastened position. When the sensor 216 detects that the male end 302 is not received by the female end 304, the sensor 216 sends, via the wiring 310, a signal to the wireless communication module 218 indicating that the male end 302 is not in the secured position. In turn, the wireless communication module 218 determines that the seatbelt 200 is in the unfastened position.

In the illustrated example, the male end 302 of the tongue 204 is composed of steel and/or another metallic material, and the sensor 216 is a micro-reed relay, a reed switch, a Hall-effect sensor and/or any other magnetically-responsive switch that detects a change in a magnetic field that is affected by the male end 302 of the tongue 204. To enable the sensor 216 to detect the change in the magnetic field, the wall 306 and/or the female end 304 of the illustrated example define an aperture through which the sensor 216 extends. The aperture enables the sensor 216 to be positioned proximate to the male end 302 when the male end 302 is received by the female end 304 so that the sensor 216 is able to detect the change in the magnetic field (e.g., by preventing the wall 306 and/or the female end 304 from interfering with detection of the magnetic field) that is affected by the male end 302 of the tongue 204.

Figure 4:
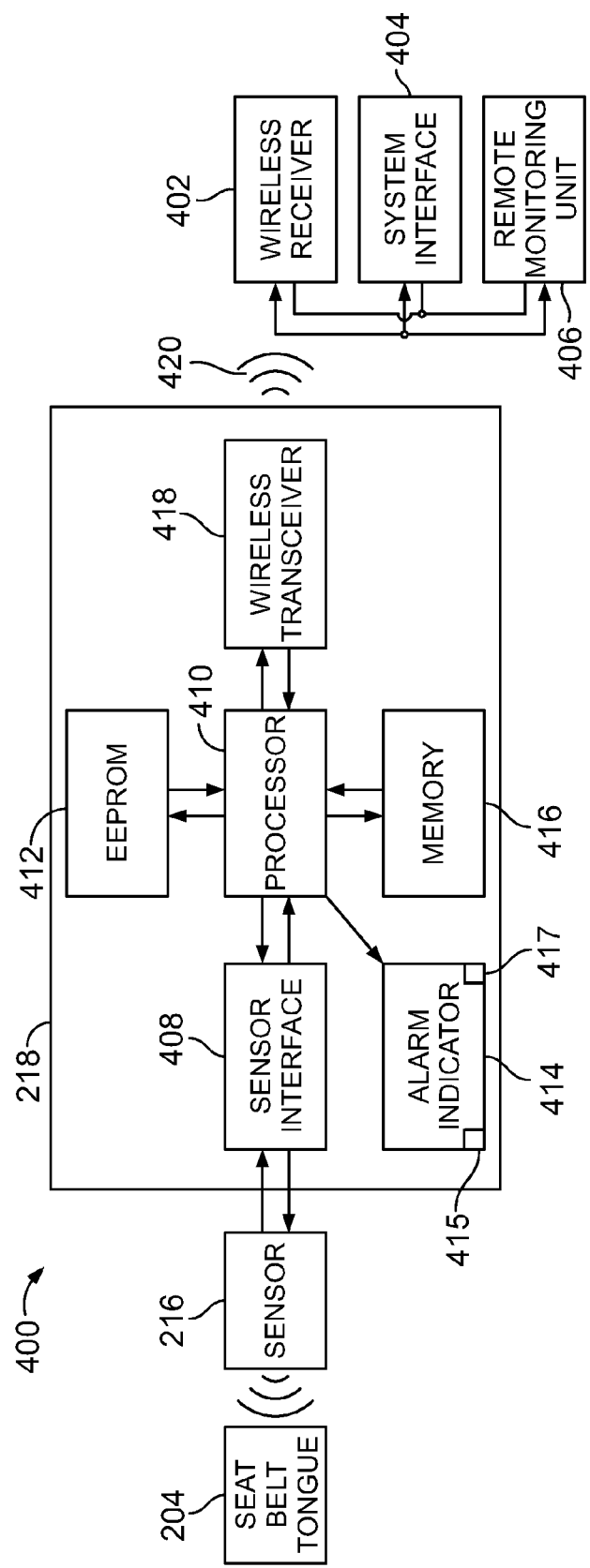
FIG. 4 is a block diagram of an example system for determining a seatbelt status in accordance with the teachings disclosed herein.

FIG. 4 is a block diagram of an example system 400 for determining seatbelt status of a mass transit vehicle in accordance with the teachings disclosed herein. The example system 400 includes the sensor 216, the wireless communication module 218, a wireless receiver 402, a system interface 404, and the remote monitoring unit 406. The sensor 216 and the wireless communication module 218 of the illustrated example are disposed in the cavity 212 (FIGS. 2A-3) of the seatbelt 200 (FIGS. 2A-3) (e.g., disposed in the recess 308 of FIG. 3), and the wireless receiver 402, the system interface 404, and the remote monitoring unit 406 are located in a remote location of the mass transit vehicle (e.g., the aircraft 100 of FIG. 1).

In the illustrated example, the sensor 216 detects if the tongue 204 of the seatbelt 200 is in the secured position and sends (e.g., via the wiring 310 of FIG. 3) a signal to the wireless communication module 218 indicating whether the tongue 204 is in the secured or fastened position or the unsecured or unfastened position.

As illustrated in FIG. 4, the wireless communication module 218 includes a sensor interface 408, a processor 410, an electrically erasable programmable read-only memory (EEPROM) 412, an alarm indicator 414, memory 416, and a wireless transceiver 418. The wireless communication module 218 is powered, for example, via a battery disposed in the cavity 212 of the buckle 202. In the illustrated example, the sensor interface 408 receives signals sent from the sensor 216 that indicate the position of the tongue 204. Additionally or alternatively, the sensor interface 408 receives signals from other sensors (e.g., sensors 606, 608 of FIGS. 6A-7) of the seatbelt 200 to determine the status of the seatbelt 200. The sensor interface 408 converts the received signals into a form compatible with the processor 410, and sends the converted signals to the processor 410.

The processor 410 of the illustrated example is hardware. For example, the processor 410 can be implemented by one or more integrated circuits, logic circuits, microprocessors or controllers from any desired family or manufacturer. In some examples, the processor 410 includes a local memory (e.g., a cache). The processor 410 of the illustrated example determines a status of the seatbelt 200 based on the signals received from the sensor interface 408. For example, if the signals indicate that the tongue 204 is in the secured position, the processor 410 determines that the seatbelt 200 is in the fastened position. In contrast, if the signals indicate that the tongue 204 is not in the secured position, the processor 410 determines that the seatbelt 200 is in the unfastened position.

The EEPROM 412 of the illustrated example stores data when power is removed from the wireless communication module 218. For example, the EEPROM 412 provides a non-volatile memory that stores a model type, a serial number and/or communication protocols of the wireless communication module 218.

In the illustrated example, the processor 410 sends an alarm signal to the alarm indicator 414 if the processor 410 determines that the seatbelt 200 is in the unfastened position. For example, the alarm indicator 414 includes an audio unit 417 adjacent the seatbelt 200 and/or the corresponding seat that emits an audio alarm if processor 410 sends a signal that the seatbelt 200 is unfastened. Additionally or alternatively, the alarm indicator 414 includes a display unit 415 adjacent the seatbelt 200 and/or the corresponding seat that provides a visual indication if the seatbelt 200 is unfastened.

In some examples, the wireless communication module 218 (e.g., the wireless transceiver 418) receives data (e.g., from the remote monitoring unit 406) that indicates whether the seat corresponding to the seatbelt 200 is occupied. In such examples, the processor 410 sends an alarm signal to the alarm indicator 414 if the processor 410 determines that the seatbelt 200 is in the unfastened position and the corresponding seat is occupied. If the seat is unoccupied, the processor 410 does not send to the alarm signal to the alarm indicator 414. As a result, the audio unit 417 and/or the display unit 415 adjacent the seatbelt 200 and/or the corresponding seat do not indicate that the seatbelt 200 is unfastened if the corresponding seat is unoccupied.

The memory 416 of the illustrated example logs a status history of the seatbelt 200 that includes times and/or durations associated with the status of the seatbelt 200. For example, the memory 416 logs a time when the seatbelt 200 becomes unfastened, a duration that the seatbelt 200 remains unfastened, a time when the seatbelt 200 becomes fastened, a duration that the seatbelt remains fastened, etc.

The example memory 416 includes volatile memory and/or non-volatile memory. Example volatile memory may be implemented by Synchronous Dynamic Random Access Memory (SDRAM), Dynamic Random Access Memory (DRAM), RAMBUS Dynamic Random Access Memory (RDRAM) and/or any other type of random access memory device. Example non-volatile memory may be implemented by flash memory and/or any other desired type of memory device. Access to the memory 416 is controlled, for example, by a memory controller. In some examples, the memory 416 of FIG. 4 is a tangible computer readable storage medium such as a flash memory, a read-only memory (ROM), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. In some examples, the memory 416 of FIG. 4 is a non-transitory computer and/or machine readable medium such as a flash memory, a read-only memory, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media.

As illustrated in FIG. 4, the wireless communication module 218 includes the wireless transceiver 418. In the illustrated example, the wireless transceiver 418 sends data from the wireless communication module 218 to the wireless receiver 402 that is located at a remote location of the mass transit vehicle. For example, the wireless transceiver 418 sends the current status of the seatbelt 200, the model type, serial number and/or communication protocols of the wireless communication module 218, and/or the status history of the seatbelt 200 to the wireless receiver 402 of the mass transit vehicle.

The system interface 404 of the illustrated example is communicatively coupled to wireless receiver 402 and the remote monitoring unit 406. The system interface 404 receives the data sent from the wireless transceiver 418 of the wireless communication module 218 and converts the received data into a form compatible with the remote monitoring unit 406. In some examples, the system interface 404 and/or the wireless receiver 402 are integral to the remote monitoring unit 406.

The remote monitoring unit 406 of the illustrated example is in a remote location of the mass transit vehicle relative to the seats of the mass transit vehicle. For example, the remote monitoring unit 406 may be located in a crew area (e.g., a crew area 507 of FIG. 5) and/or a flight deck (e.g., a flight deck 501 of FIG. 5) of the mass transit vehicle. The remote monitoring unit 406 indicates the status of the seatbelt 200 to enable a crew member of the mass transit vehicle (e.g., an attendant, a pilot, etc.) to identify whether the seatbelt is unfastened without having to enter a passenger compartment (e.g., the passenger compartment 110 of FIGS. 1 and 5) to visually inspect the seatbelt 200. For example, the remote monitoring unit 406 provides a visual indication and/or emits an audio alarm if the seatbelt 200 is in the unfastened position.

Figure 5:
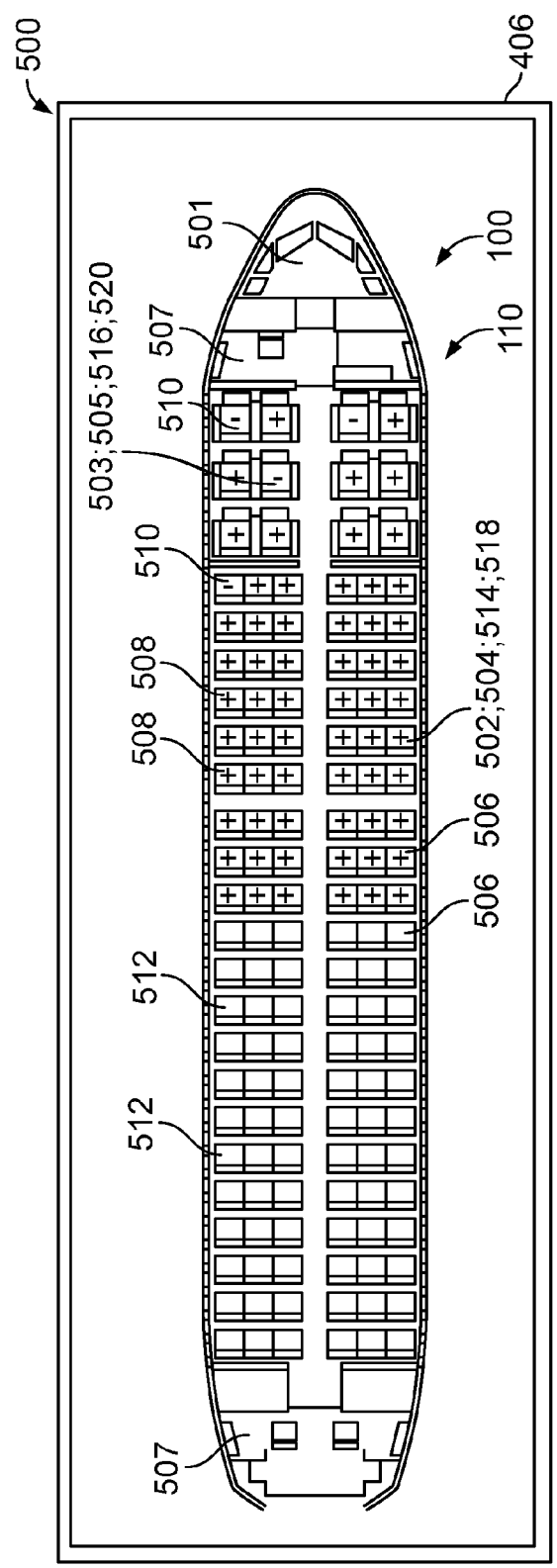
FIG. 5 is an example display of an example remote monitoring unit of the example system of FIG. 4.

FIG. 5 is an example display 500 of the remote monitoring unit 406 that indicates status of seatbelts of the example aircraft 100. The example display 500 displays the flight deck 501, the crew areas 507, and the passenger compartment 110 of the aircraft 100. As illustrated in FIG. 5, the passenger compartment 110 of the display 500 includes passenger seats 506.

The seats 506 of the passenger compartment 110 include respective seatbelts to secure passengers in the seats 506 during travel. For example, each of the seats 506 has a seatbelt (e.g., the seatbelts 200 of FIGS. 2-3) that includes a sensor and/or sensors (e.g., the sensor 216 of FIGS. 2-4, the sensors 606, 608 of FIGS. 6A-7) to detect a status (e.g., fastened, unfastened, unoccupied) of the seatbelt and includes a wireless communication module (e.g., the wireless communication module 218 of FIGS. 2-4) to communicate the status of the seatbelt to the remote monitoring unit 406. For example, one of the seats 506 (e.g., a first seat) includes a wireless communication module (e.g., a first wireless communication module having a first transceiver) that sends a wireless signal 420 (e.g., a first wireless signal) to the remote monitoring unit 406, and another of the seats (e.g., a second seat) includes a wireless communication module (e.g., a second wireless communication module having a second transceiver) that sends a wireless signal 420 (e.g., a second wireless signal) to the remote monitoring unit 406. Further, in some examples, a flight manifest is entered into the remote monitoring unit 406 that indicates which of the seats 506 are occupied by a passenger for a flight.

As illustrated in FIG. 5, the example display 500 visually indicates which of the seats 506 of the passenger compartment are unoccupied, are occupied and correspond to a seatbelt in the fastened position, and/or are occupied and correspond to a seatbelt in the unfastened position. In some examples, the seats 506 include a first seat 502 and a second seat 503 where the seats 502, 503 are implemented with respective seatbelts 504, 505 as disclosed herein. In some examples, the first seat belt 504 and the second seatbelt 505 are implemented by the example seatbelt 200 of FIG. 2 and/or the example seatbelt 600 of FIG. 6. For example, the display 500 indicates that seats 508 are occupied and have seatbelts in the fastened position. In the illustrated example, the seats 508 are represented by a "+" symbol. In other examples, the seats 508 are identified in the display 500 by a first color (e.g., a green symbol such as a green circle, a green rectangle, a green seat, etc.). The example display 500 indicates that seats 510 are occupied and have seatbelts in the unfastened position. For example, the seats 510 of FIG. 5 are represented by a "−" symbol. In other examples, the seats 508 are identified in the display 500 by a second color (e.g., a red symbol such as a red circle, a red rectangle, a red seat, etc.). Further, the example display 500 indicates that seats 512 are unoccupied. In the illustrated example, the unoccupied seats 512 do not include a symbol. In other examples, the seats 512 are identified in the display 500 by a third color (e.g., a grey seat). Additionally or alternatively, the remote monitoring unit 406 emits an audio alarm if at least one of the occupied seatbelts is unfastened to alert a crew member of the example aircraft 100 that at least one of the passengers is not secured in a seat. As a result, the example remote monitoring unit 406 enables attendants and/or other crew members to continuously monitor status of the seatbelts of the aircraft from a single location without having to traverse through the passenger compartment 110 to visually inspect the seatbelts of the passengers.

FIGS. 6A-6B illustrate another example seatbelt 600 of a mass transit vehicle in accordance with the teachings herein. More specifically, FIG. 6A is a perspective view of the example seatbelt 600, and FIG. 2B is a rear view of the example seatbelt 600. In the illustrated example, the seatbelt 600 is in a fastened position in which the tongue 204 is in the secured position (e.g., the tongue 204 is securely received by the buckle 202) to secure a passenger in a seat. As illustrated in FIGS. 6A-6B, the example seatbelt 600 includes release latches 602, 604 that are in rest positions when the tongue 204 is securely received by the buckle 202 to maintain and/or secure the tongue 204 in the secured position and, thus, to maintain and/or secure the seatbelt 600 in the fastened position. For example, when the seatbelt 600 is in the fastened position, the release latches 602, 604 are in the respective rest positions to engage and/or are positioned adjacent the tongue 204 to deter, impede and/or prevent the tongue 204 from decoupling from the buckle 202. To transition the example seatbelt 600 from the fastened position to an unfastened position, the passenger pushes the release button 214 and the release latches 602, 604 to their respective release positions and removes the tongue 204 from the cavity 212 of the buckle 202. Thus, the release latches 602, 604 enhance the safety provided by the seatbelt 600 by maintaining the seatbelt 600 in the fastened position if the release button 214 is accidently pushed by the passenger.

As illustrated in FIG. 6B, the example seatbelt 200 includes the sensor 216, sensors 606, 608, and the wireless communication module 218 disposed in the cavity 212 of the buckle 202. In the illustrated example, the sensor 216 detects whether the tongue 204 is in the secured position, the sensor 606 detects whether the release latch 602 is in the release position, and the sensor 608 detects whether the release latch 604 is in the release position.

In the illustrated example, the sensors 216, 606, 608 are in communication (e.g., electronic communication, wired communication, etc.) with the wireless communication module 218. The wireless communication module 218 of the illustrated example determines a status of the seatbelt 600 (e.g., whether the seatbelt 600 is in the fastened position or the unfastened position) based on the sensors 216, 606, 608. For example, the wireless communication module 218 determines that the seatbelt 600 is in the fastened position if the sensor 216 detects that the tongue 204 is in the secured position, the sensor 606 detects that the release latch 602 is in the rest position, and the sensor 608 detects that the release latch 604 is in the rest position. In contrast, the example wireless communication module 218 determines that the seatbelt 600 is in the unfastened position if the sensor 216 detects that the tongue 204 is not in the secured position, the sensor 606 detects that the release latch 602 is in the release position, and/or the sensor 608 detects that the release latch 604 is in the release position. Further, the example wireless communication module 218 wirelessly communicates the status of the seatbelt 200 to a remote location (e.g., the remote monitoring unit 406 of FIG. 4) of the mass transit vehicle (e.g., the aircraft 100 of FIG. 1). In other examples, the remote monitoring unit 406 that is in communication with the wireless communication module 218 determines the status of the seatbelt 600 based on the sensors 216, 606, 608.

Figure 6:
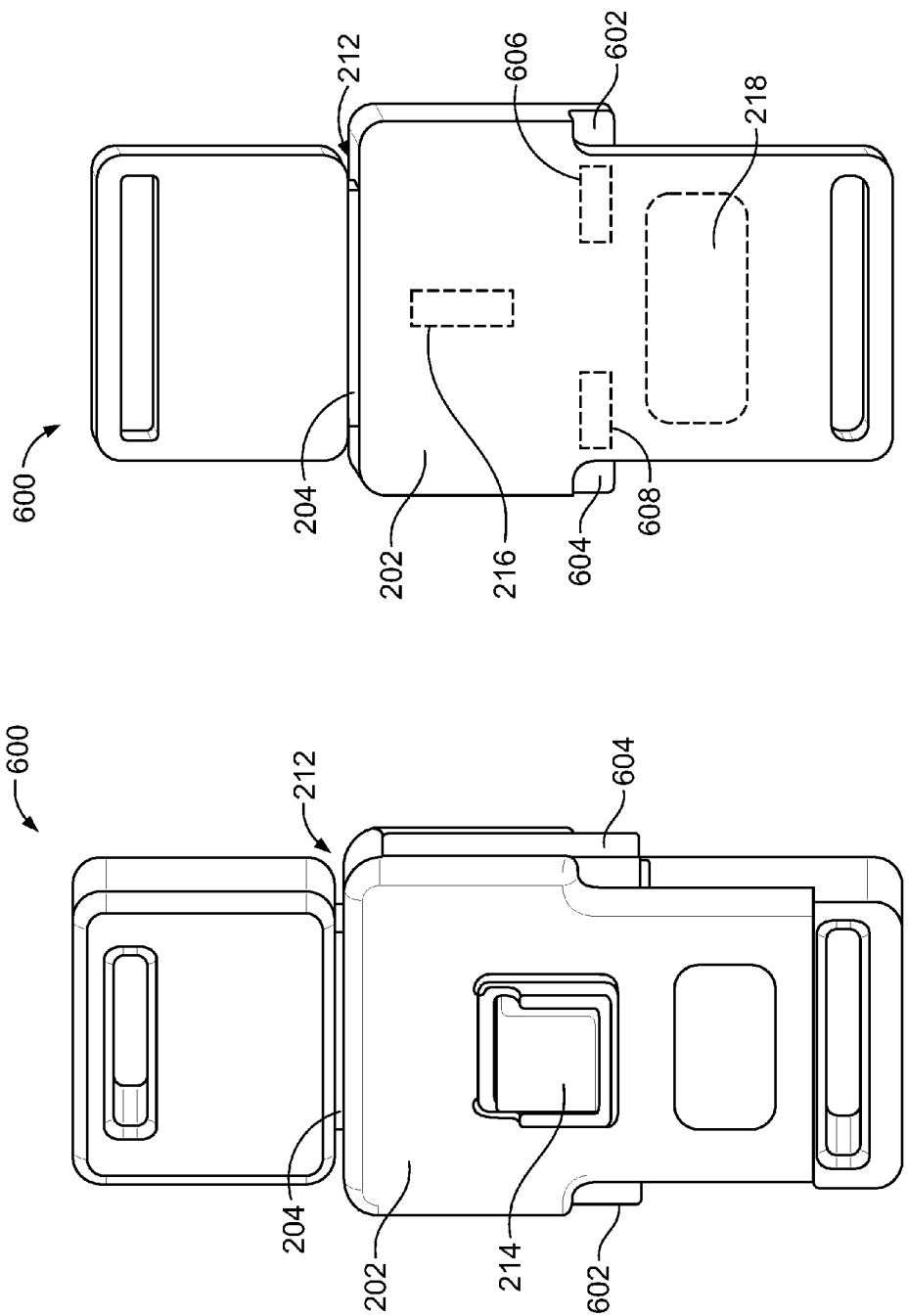
FIG. 6A is a perspective view of another example seatbelt constructed in accordance with the teachings disclosed herein.
FIG. 6B is a rear view of the example seatbelt of FIG. 6A.
Figure 7:
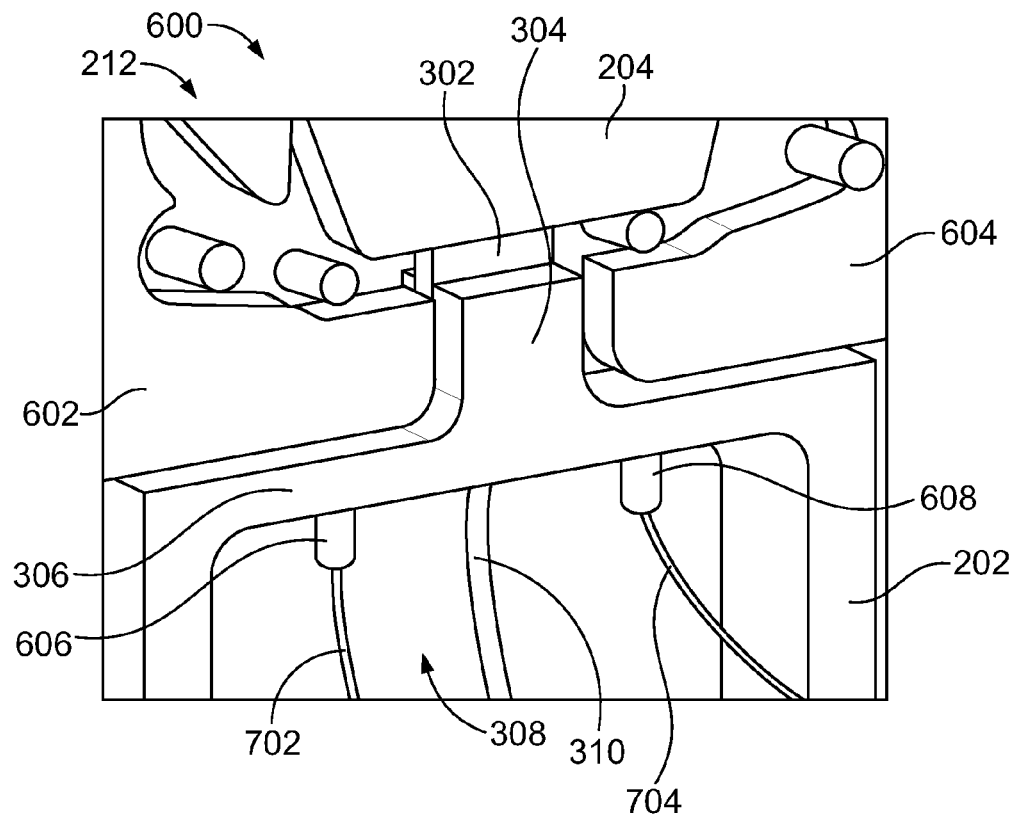
FIG. 7 depicts a cavity of a buckle of the example seatbelt of FIGS. 6A-6B in a fastened position.

FIG. 7 depicts the cavity 212 of the buckle 202 of the example seatbelt 600 in the fastened position. As illustrated in FIG. 7, the female end 304 is coupled to the wall 306 that defines the recess 308 in the cavity 212 of the buckle 202. The recess 308 defined by the wall 306 contains the wireless communication module 218 (FIG. 2), a battery to power the wireless communication module 218 and/or other electrical components disposed in the cavity 212 of the buckle 202. For example, the recess 308 of the illustrated example contains the wiring 310 that couples the sensor 216 (FIG. 6B) to the wireless communication module 218, wiring 702 that couples the sensor 606 to the wireless communication module 218, and wiring 704 that couples the sensor 608 to the wireless communication module 218.

In the illustrated example, to determine the status of the seatbelt 600, the sensor 216 detects whether the male end 302 of the tongue 204 is received by the female end 304 of the buckle 202, the sensor 606 detects whether the release latch 602 is in the rest position, and the sensor 608 detects whether the release latch 604 is in the rest position. The sensors 216, 606, 608 send signals to the wireless communication module 218 that enables the wireless communication module 218 (or another device such as the remote monitoring unit 406 of FIG. 4) to determine whether the seatbelt 200 is in the fastened position or the unfastened position.

In the illustrated example, the male end 302 of the tongue 204 and the release latches 602, 604 are composed of steel and/or another metallic material, and the sensors 216, 606, 608 are micro-reed relays, reed switches, Hall-effect sensors, and/or other magnetically-responsive switches. To enable the sensors 606, 608 to detect magnetic fields that are affected by the corresponding release latches 602, 604, the wall 306 of the illustrated example defines apertures through which the corresponding sensors 606, 608 extend. The apertures enable the sensors 606, 608 to be positioned proximate to the corresponding release latches 602, 604 when the release latches 602, 604 are in the rest positions so that the sensors 606, 608 are able to detect the magnetic fields that are affected by the corresponding release latches 602, 604 without interference from the wall 306.

Figure 8:
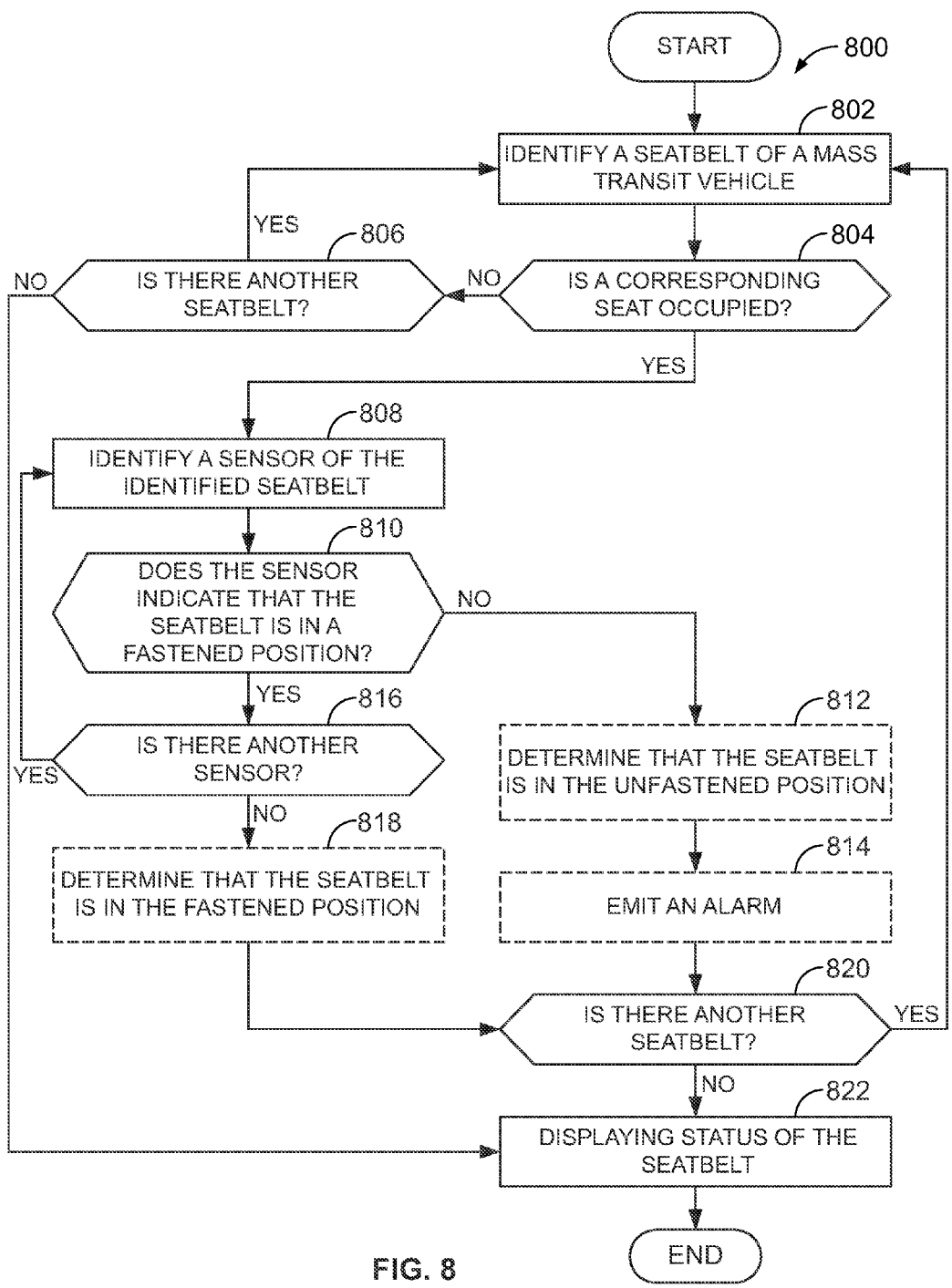
FIG. 8 is a flowchart representative of an example method to implement the example system of FIG. 4 to determine a status of the example seatbelt of FIGS. 2A-3 and/or the example seatbelt of FIGS. 6A-7 in accordance with the teachings herein.

FIG. 8 is a flowchart representative of an example method 800 to determine status of seatbelts of a mass transit vehicle. Although the example method 800 is described with reference to the flowchart illustrated in FIG. 8, many other methods of determining status of seatbelts of a mass transit vehicle may alternatively be used. For example, the order of execution of the blocks may be changed, and/or some of the blocks described changed, eliminated, and/or combined.

The example method 800 for determining status of seatbelts of a mass transit vehicle (e.g., the aircraft 100 of FIG. 1) is discussed in connection with the example seatbelt 200 of FIGS. 2A-3, the example system 400 of FIG. 4, the example display 500 of FIG. 5 and/or the example seatbelt 600 of FIGS. 6A-7. Further, because the example method 800 may use the example seatbelt 200 of FIGS. 2A-3, the example system 400 of FIG. 4, the example display 500 of FIG. 5 and/or the example seatbelt 600 of FIGS. 6A-7 to determine status of seatbelts of a mass transit vehicle, components identified in FIGS. 2A-7 having functions substantially similar or identical to the functions of components described below will not be described in detail again. Instead, the same reference numbers will be used for like structures.

The example method 800 disclosed herein starts by identifying a seatbelt of a mass transit vehicle (block 802). For example, the remote monitoring unit 406 (FIG. 4) identifies the seatbelt 200 (FIGS. 2A-3) or the seatbelt 600 (FIGS. 6A-7) of the aircraft 100 (FIGS. 1 and 5). At block 804, the example method 800 determines whether the seat (e.g., one of the seats 506 of FIG. 5) corresponding to the identified seatbelt (e.g., the seatbelt 200, the seatbelt 600) is occupied. For example, the remote monitoring unit 406 determines if the seat 506 is occupied based on the flight manifest. If the seat 506 is not occupied, the remote monitoring unit 406 determines if there is another seatbelt (e.g., the seatbelt 200, the seatbelt 600) (block 806). If there is another seatbelt, blocks 802, 804 are repeated.

If the corresponding seat 506 is occupied at block 804, the example method 800 identifies a sensor (e.g., the sensor 216 of FIGS. 2B, 3, 6B, and 7) of the identified seatbelt (e.g., the seatbelt 200, the seatbelt 600) that corresponds to an occupied seat 506 (block 808). For example, the wireless communication module 218 (FIGS. 2B, 4, and 6B) of the seatbelt and/or the remote monitoring unit 406 identifies the sensor 216 of the seatbelt. At block 810, the wireless communication module 218 of the seatbelt and/or the remote monitoring unit 406 determines whether the sensor 216 indicates that the seatbelt is in a fastened position. For example, the sensor 216 indicates that the seatbelt is in the fastened position if the sensor 216 detects that the tongue 204 (e.g., FIGS. 2A-3 and 6A-7) of the seatbelt is received by the buckle 202 (e.g., FIGS. 2A-3 and 6A-7) of the seatbelt and indicates that the seatbelt is not in the fastened position if the sensor 216 detects that the tongue 204 is not received by the buckle 202.

If the identified sensor 216 indicates that the seatbelt is not in the fastened position, the wireless communication module 218 of the seatbelt and/or the remote monitoring unit 406 determines that the seatbelt is in the unfastened position (block 812). At block 814, the example method optionally emits an alarm indicating that the seatbelt is unfastened. For example, the remote monitoring unit 406 and/or an audio unit 417 adjacent the seat 506 emits an audio alarm to alert a passenger and/or a crew member of the mass transit vehicle 100 that the seatbelt of the occupied seat 506 is unfastened. As shown in the example of FIG. 5, a first audio unit 518 is positioned adjacent the first seat 502 and a second audio unit 520 is positioned adjacent the second seat 503. The first and second audio units 518, 520 may be implemented by the display unit 415 of the alarm audio unit 417.

If the identified sensor 216 indicates that the seatbelt is not in the fastened position, the wireless communication module 218 of the seatbelt and/or the remote monitoring unit 406 determines if there is another sensor of the identified seatbelt (block 816). If there is another sensor of the identified seatbelt, blocks 808, 810 are repeated. For example, the method 800 repeats blocks 808, 810 to identify and determine whether the sensors 606, 608 (FIGS. 6B-7) that detect positions of the corresponding release latches 602, 604 (FIGS. 6A-7) indicate that the seatbelt is in the fastened position. For example, the sensors 606, 608 associated with the release latches 602, 604 indicate that the seatbelt is in the fastened position if the sensors 606, 608 detect that the corresponding release latches 602, 604 are in the rest positions and indicate that the seatbelt is not in the fastened position if the sensors 606, 608 detect that the corresponding release latches 602, 604 are in the release position. If, at block 816, the wireless communication module 218 of the seatbelt and/or the remote monitoring unit 406 identifies that there are no other sensors of the identified seatbelt, the wireless communication module 218 of the seatbelt and/or the remote monitoring unit 406 determines that the identified seatbelt is in the fastened position (block 818).

Upon determining that the seatbelt is in the fastened position or the unfastened position, the remote monitoring unit 406 determines if there is another seatbelt (e.g., the seatbelt 200 of FIGS. 2A-3, the seatbelt 600 of FIGS. 6A-7) of the mass transit vehicle 100 (block 820). If the remote monitoring unit 406 determines that there is another seatbelt of the mass transit vehicle 100, the example method 800 repeats blocks 802, 804, 806, 808, 810, 812, 814, 816, 818.

Upon determining that there are no other seatbelts at block 806 or block 820, the example method displays status of the identified seatbelt(s) 506 (block 822). For example, the display 500 (e.g., FIG. 5) of the remote monitoring unit 406 indicates the seats that are occupied and have fastened seatbelts (e.g., the seats 508 of FIG. 5), the seats that are occupied and have fastened seatbelts (e.g., the seats 510 of FIG. 5), and/or the seats that are unoccupied (e.g., the seats 512 of FIG. 5). Additionally or alternatively, display units 415 adjacent respective seats 506 of the mass transit vehicle 100 indicate whether the seatbelt of the corresponding seat is unoccupied, occupied with a fastened seatbelt, and/or occupied with an unfastened seatbelt. As shown in the example of FIG. 5, a first display unit 514 is positioned adjacent the first seat 502 and a second display unit 516 is positioned adjacent the second seat 503. The first and second display units 514, 516 may be implemented by the display unit 415 of the alarm indicator 414.

Although certain example methods and apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. A seatbelt system for a mass transit vehicle, the system comprising:
   a seatbelt of a seat including a buckle defining a cavity to receive a tongue in a fastened position and a sensor disposed in the cavity to detect the tongue when the seatbelt is in the fastened position, the buckle including a window having a material different than another portion of the buckle to enable a signal to be transmitted from the buckle, via the window, regarding a status of the seatbelt; and
   a remote monitoring unit to indicate if the seatbelt is in the fastened positioned or an unfastened position when the seat is occupied.

2. The system of claim 1, wherein the seat is a first seat, if the first seat is unoccupied, the remote monitoring unit is to display that the first seat is unoccupied and, wherein, if a second seat is unoccupied, the remote monitoring unit is to display that the second seat is unoccupied.

3. The system of claim 1, wherein the seat is a first seat and the seatbelt is a first seatbelt, the remote monitoring unit is to emit an audio alarm if at least one of the first seat is occupied and the first seatbelt is in the unfastened position or a second seat is occupied and a second seatbelt is in the unfastened position.

4. The system of claim 1, wherein the seat is a first seat and the seatbelt is a first seatbelt, further including:
   a first display unit adjacent the first seat to indicate if the first seat is occupied and the first seatbelt is unfastened; and
   a second display unit adjacent a second seat to indicate if the second seat is occupied and a second seatbelt is unfastened.

5. A seatbelt system for a mass transit vehicle, the system comprising:
   a first seatbelt of a first seat including a first buckle defining a first cavity to receive a first tongue in a fastened position and a first sensor disposed in the first cavity to detect the first tongue when the first seatbelt is in the fastened position;
   a second seatbelt of a second seat including a second buckle defining a second cavity to receive a second tongue in the fastened position and a second sensor disposed in the second cavity to detect the second tongue when the second seatbelt is in the fastened position;
   a remote monitoring unit to indicate:
      when the first seat is occupied, if the first seatbelt is in the fastened positioned or an unfastened position;
      when the second seat is occupied, if the second seatbelt is in the fastened positioned or the unfastened position;
   a first audio unit adjacent the first seat to emit a first audio alarm if the first seat is occupied and the first seatbelt is unfastened; and
   a second audio unit adjacent the second seat to emit a second audio alarm if the second seat is occupied and the second seatbelt is unfastened.

6. The system of claim 1, wherein the sensor is a micro-reed relay, a reed switch, or a Hall-effect sensor.

7. The system of claim 1, wherein the seat is a first seat, the seatbelt is a first seatbelt, and the buckle is a first buckle, further including:

a first wireless transceiver coupled to the first buckle to wirelessly transmit a status of the first seatbelt to a wireless receiver of the remote monitoring unit; and
a second wireless transceiver coupled to a second buckle to wirelessly transmit a status of a second seatbelt to the wireless receiver of the remote monitoring unit.

8. The system of claim 7, wherein the first and second wireless transceivers are Bluetooth modules.

9. The system of claim 5, wherein the first and second tongues are composed of a metallic material to enable the first and second sensors to detect the first and second tongues.

10. A seatbelt system for a mass transit vehicle the system comprising:
a first seatbelt of a first seat including a first buckle defining a first cavity to receive a first tongue in a fastened position and a first sensor disposed in the first cavity to detect the first tongue when the first seatbelt is in the fastened position, wherein the first seatbelt further includes a first release latch that is to move from a rest position to a release position to enable the first tongue to transition between the fastened position and an unfastened position, the first seatbelt further includes a second sensor to detect when the first release latch is in the rest position, the first seatbelt is in the unfastened position when the first release latch is in the release position, the first seatbelt further includes a second release latch that is to move from a rest position to a release position to enable the first tongue to transition between the fastened position and the unfastened position, the first seatbelt further includes a third sensor to detect when the second release latch is in the rest position, the first seatbelt is in the unfastened position when the first release latch or the second release latch are in the release position;
a second seatbelt of a second seat including a second buckle defining a second cavity to receive a second tongue in the fastened position and a fourth sensor disposed in the second cavity to detect the second tongue when the second seatbelt is in the fastened position; and
a remote monitoring unit to indicate:
when the first seat is occupied, if the first seatbelt is in the fastened positioned or the unfastened position; and
when the second seat is occupied, if the second seatbelt is in the fastened positioned or the unfastened position.

11. A method for monitoring seatbelts in a mass transit vehicle, the method comprising:
detecting, via a first sensor, if a first seatbelt of a first seat is in a fastened position or an unfastened position, the first sensor is disposed in a first buckle of the first seatbelt to detect a first tongue when the first seatbelt is in the fastened position;
detecting, via a second sensor, if a second seatbelt of a second seat is in the fastened position or the unfastened position, the second sensor is disposed in a second buckle of the second seatbelt to detect a second tongue when the second seatbelt is in the fastened position;
communicating a status of the first seatbelt through a first portion of the first seatbelt and a status of the second seatbelt through a second portion of the second seatbelt to a remote monitoring unit, the first and second portions including windows having properties to enable signals regarding the respective statuses to be transmitted therethrough; and
displaying, via the remote monitoring unit, the status of the first seatbelt when the first seat is occupied and the status of the second seatbelt when the second seat is occupied.

12. The method of claim 11, wherein communicating the status of the first seatbelt to the remote monitoring unit includes wirelessly communicating the status of the first seatbelt from a first wireless transceiver coupled to the first seatbelt to a wireless receiver of the remote monitoring unit, and wherein communicating the status of the second seatbelt to the remote monitoring unit includes wirelessly communicating the status of the second seatbelt from a second wireless transceiver coupled to the second seatbelt to the wireless receiver of the remote monitoring unit.

13. The method of claim 11, further including logging a first status history of the first seatbelt and logging a second status history of the second seatbelt.

14. The method of claim 11, further including:
detecting, via a third sensor disposed in the first buckle, a position of a first release latch of the first seatbelt, the first release latch is to transition from a rest position to a release position to enable the first tongue to transition between the fastened position and the unfastened position, the first seatbelt is in the unfastened position when the first release latch is in the release position; and
detecting, via a fourth sensor disposed in the second buckle, a position of a second release latch of the second seatbelt, the second release latch is to transition from a rest position to a release position to enable the second tongue to transition between the fastened position and the unfastened position, the second seatbelt is in the unfastened position when the second release latch is in the release position.

15. A mass transit vehicle system comprising:
first means for detecting when a first seatbelt of a first seat is in a fastened position, the first means for detecting is disposed in a first buckle of the first seatbelt to detect a first tongue when the first seatbelt is in the fastened position;
second means for detecting when a second seatbelt of a second seat is in the fastened position, the second means for detecting is disposed in a second buckle of the second seatbelt to detect a second tongue when the second seatbelt is in the fastened position;
means for communicating a status of the first seatbelt through a first portion of the first seatbelt and a status of the second seatbelt through a second portion of the second seatbelt, the first and second portions including windows having properties to enable signals regarding the respective statuses to be transmitted therethrough; and
means for displaying to indicate the status of the first seatbelt when the first seat is occupied and to display the status of the second seatbelt when the second seat is occupied.

16. The system of claim 15, wherein the means for displaying is to:
indicate that the first seat is unoccupied, the first seat is occupied and the first seatbelt is in the fastened position, or the first seat is occupied and the first seatbelt is in an unfastened position; and
indicate that the second seat is unoccupied, the second seat is occupied and the second seatbelt is in the fastened position, or the second seat is occupied and the second seatbelt is in the unfastened position.

17. The system of claim 15, wherein the means for communicating includes means for wirelessly communicating the status of the first seatbelt and the status of the second seatbelt to the means for displaying.

* * * * *